United States Patent [19]

Boppart et al.

[11] Patent Number: 5,277,716
[45] Date of Patent: Jan. 11, 1994

[54] METHOD OF CONTROLLING THE SOLVENT VAPOR CONCENTRATION IN AN APPARATUS

[75] Inventors: Stephan W. Boppart, Wädenswil; Marius A. M. Kümin, Cham, both of Switzerland

[73] Assignee: The Dow Chemical Company, Midland, Mich.

[21] Appl. No.: 716,178

[22] Filed: Jun. 17, 1991

Related U.S. Application Data

[63] Continuation-in-part of Ser. No. 615,724, Nov. 19, 1990, abandoned.

[30] Foreign Application Priority Data

Dec. 20, 1990 [GB] United Kingdom ............... 9027705

[51] Int. Cl.⁵ .......................... B08B 3/04; B08B 5/00; F26B 3/04
[52] U.S. Cl. ......................... 134/10; 134/11; 34/27; 34/34; 34/77; 34/80; 68/5 E
[58] Field of Search ............... 134/11, 10, 12; 34/26, 34/27, 32, 34, 80, 81, 77; 8/158; 68/18R; 5E; 55/74, 208

[56] References Cited

U.S. PATENT DOCUMENTS

| | | | |
|---|---|---|---|
| 3,844,739 | 10/1974 | Alfrey | 55/74 |
| 4,056,369 | 11/1977 | Quackenbush | 55/58 |
| 4,101,340 | 7/1978 | Rand | 134/11 |
| 4,297,220 | 10/1981 | Meitzner et al. | 210/690 |
| 4,622,039 | 11/1986 | Merenda | 134/12 X |
| 4,788,776 | 12/1988 | Fuhring et al. | 34/76 |
| 4,817,296 | 4/1989 | Kabakov et al. | 34/77 |
| 4,844,743 | 7/1989 | Koblenzer et al. | 134/11 |
| 4,850,119 | 7/1989 | Führing et al. | 34/77 |

Primary Examiner—Theodore Morris
Assistant Examiner—Saeed T. Chaudhry

[57] ABSTRACT

The solvent vapor concentration which is mixed with air and is obtained in the treatment of articles in an apparatus is controlled in the apparatus by a method comprising the following steps:
a) passing gaseous solvent vapor/air mixture from the apparatus through at least one adsorber containing an adsorbent for the organic solvent and recycling the outlet gas stream from the adsorber to the apparatus;
b) after completion of the adsorption, opening the apparatus to enable removal of treated articles from the apparatus and closing the apparatus;
c) heating the adsorbent and passing a gas stream from the apparatus through the adsorber and recycling the outlet stream from the adsorber directly to the apparatus.

11 Claims, 6 Drawing Sheets

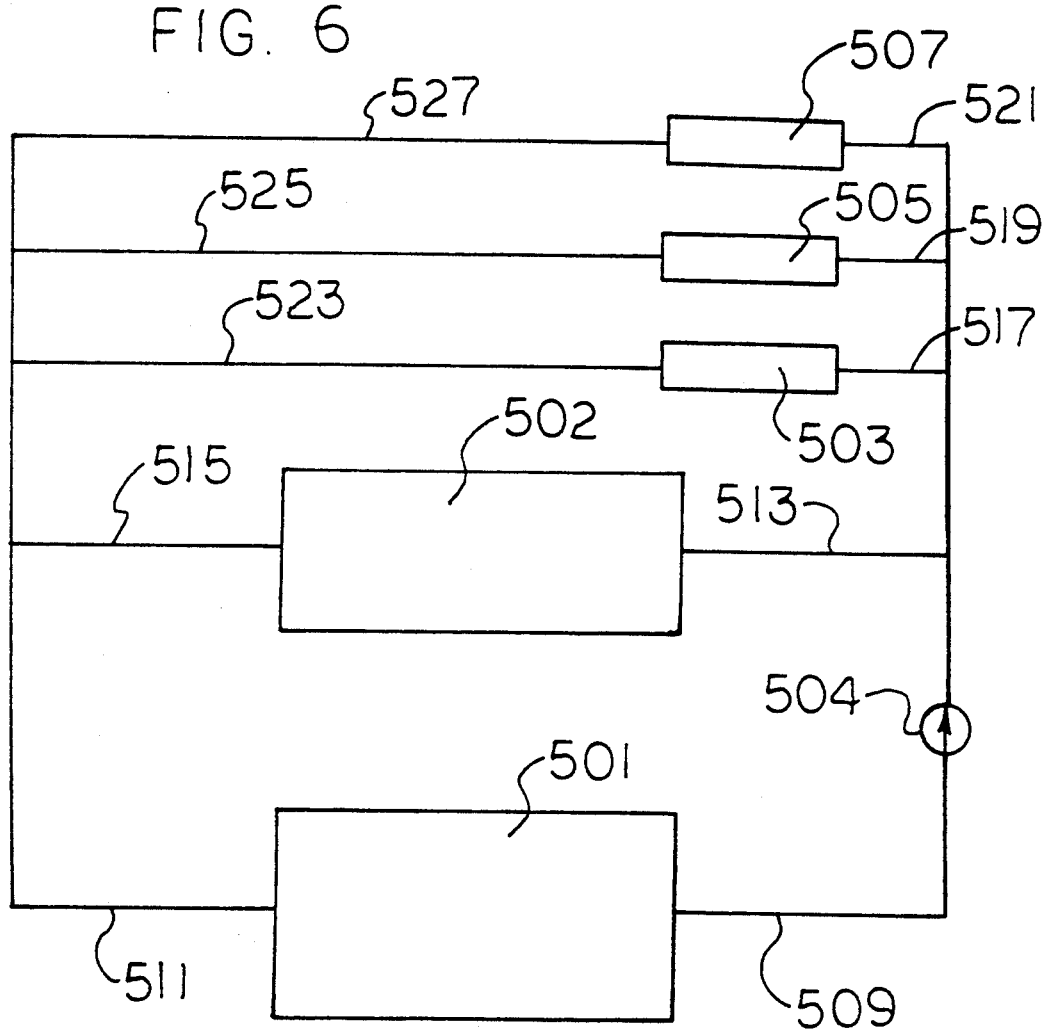

METHOD OF CONTROLLING THE SOLVENT VAPOR CONCENTRATION IN AN APPARATUS

CROSS REFERENCE TO RELATED APPLICATION

This application is a continuation-in-part of the co-pending application Ser. No. 07/615,724 filed Nov. 19, 1990 now abandoned.

BACKGROUND OF THE INVENTION

The present invention relates to a method of controlling the solvent vapor concentration in an apparatus as well as apparatuses useful therefore. The solvent vapor is mixed with air and is obtained in the treatment of articles, such as a cleaning process, in the apparatus.

Methods and apparatuses for treating, for example cleaning, articles with organic solvents are well known. They are for example used in the dry cleaning of textiles etc. and for the degreasing of metals. The organic solvents are recovered during the drying phase in order to avoid losses of solvents and environmental pollution associated therewith. In some cleaning processes the gaseous organic solvents which are in the apparatus during the drying phase are cooled and condensed in a condenser. However, mainly hydrocarbons and particularly chlorinated and/or fluorinated hydrocarbons are used as solvents in the cleaning process. Many of them, for example, trichlorotrifluroethane, 1,1,1-trichloroethane, trichloromonofluoromethane, perchloroethylene, trichloroethylene or methylene chloride have a low boiling point and cannot be recovered by condensation to a sufficient extent. Therefore, the non-condensed organic solvents are usually adsorbed by adsorbents, such as activated carbon. Several processes have been suggested for recovering the organic solvents in the cleaning of articles.

U.S. Pat. No. 3,883,325 suggests recovering solvent vapors from an air stream which is recycled through an air cooler and then through an adsorbing unit in which the air stream, after it has left the cooler, is heated again before entering the adsorber. It is suggested that the air stream is first passed through the cooler bypassing the adsorber and then, after the solvent concentration in the air has been reduced, the adsorber is connected into the circuit. Activated carbon is used for adsorbing the organic solvents.

British patent specification 996,578 relates to a dry cleaning apparatus comprising a cleaning drum, a condenser and a solvent adsorber which is filled with activated carbon. German Offenlegungsschrift 37 37 783 also relates to a dry cleaning machine having a cleaning drum, a condenser and an adsorber containing activated carbon.

According to the teachings of U.S. Pat. No. 3,883,325, British patent 996,578 and German Offenlegungsschrift 37 37 783, activated carbon is regenerated with steam, the steam-solvent mixture is condensed and water is separated from the organic solvent. This necessary separation step is disadvantageous.

Accordingly, other methods and means for regenerating the adsorbent, such as activated carbon, have been suggested.

U.S. Pat. No. 4,583,985 relates to the recovery of organic solvents in dry cleaning and solvent finishing. In the taught process the solvents which occur in the form of a solvent vapor/air mixture are partially condensed by cooling. A saturation partial pressure of the solvent in the solvent vapor/air mixture of not more than 0.25 is set up. The solvent vapors are adsorbed with activated carbon while the solvent free air is blown out to the environment. The adsorbed solvents are desorbed by means of a solvent vapor/air mixture of the same concentration as in the adsorption process and at temperatures of 100° C. to 150° C., the flow through the activated carbon being in the opposite direction to that in the adsorption process. The desorbed solvent is condensed in a condenser. However, a condenser having a relatively high heat exchange area and a high performance compressor are necessary in combination with a liquefier in order to reach this saturation partial pressure. Furthermore, although a high amount of solvent vapor is adsorbed in the activated carbon, there is still a risk of solvent release to the environment. An undesirably high amount of solvent vapor may be released to the environment if the adsorption capacity of the activated carbon is close to exhaustion or is exhausted.

German Patent 36 09 578 (equivalent to U.S. Pat. No. 4,788,776) suggests a dry-cleaning machine containing a cleaning drum, a heat exchange unit, consisting of a cooler and a heater, one adsorber and a fan for circulating air. The conduit system has several by-passes which allow the following connections, seen in the direction of the circulating air: a) cleaning drum - heat exchange unit - cleaning drum, b) cleaning drum - adsorber - cleaning drum, c) adsorber - heat exchange unit - adsorber. In the disclosed cleaning process the solvent vapor is partially condensed by circulating the solvent vapor/air mixture in conduit system b) and the adsorbed solvent is then desorbed by circulating air in conduit system c) wherein the air is heated in the heater, the hot air desorbs the solvent in the adsorber at a high temperature and the desorbed solvent is condensed in the cooler. However, the necessary by-passes require considerable space and at least four butterfly valves.

For avoiding these by-passes and butterfly valves German Offenlegungsschrift 37 26 245 (equivalent to U.S. Pat. No. 4,850,119) suggests, after partial condensation of the solvent vapors originating from the cleaning drum, removal of a portion of the circulating air stream which portion is passed over an adsorber. Two dependent air circulations are suggested. The adsorbent in the adsorber is regenerated with hot gas and the desorbed solvent is condensed in a cooler. Unfortunately, the suggested process and equipment are relatively complicated.

European patent 157 090 suggests a cleaning machine containing a treating chamber, a drying compartment and a drying gas circuit. The cleaned articles are dried by means of a drying gas. In the drying gas circuit are arranged, seen in the direction of the circulating drying gas, a cooler, an adsorber and the drying compartment. In the drying and desorption phase of the cleaning process, the solvent vapor of the drying gas is partially condensed in the condenser and the drying gas is then passed over the heated adsorber for desorbing solvent vapor from the adsorber. The desorbed solvent vapor is condensed in the condenser. The drying gas is purified by passing it over a cooled adsorber. However, the condensation of all the solvent vapors is energy-consuming.

Due to the deficiencies of the known methods of recovering solvent vapors and of the known apparatuses for treating articles, it would be desirable to provide a simple solution for solving the problems relating to the solvent vapors in the treatment of articles, such as cleaning operations. Specifically, it would be desirable to avoid the contact of the solvent vapors with steam during their desorption. Furthermore, it would be desirable to provide a very simple apparatus for treating articles which minimizes the contamination of the environment with solvent vapors during its operation.

SUMMARY OF THE INVENTION

Accordingly, one aspect of the present invention is a method of controlling the solvent vapor concentration in an apparatus which solvent vapor is mixed with air and is obtained in the treatment of articles in the apparatus. The method of the present invention comprises the following steps:

a) passing gaseous solvent vapor/air mixture from the apparatus through at least one adsorber containing an adsorbent for the organic solvent and recycling the outlet stream from the adsorber to the apparatus;

b) after completion of the adsorption, opening the apparatus to enable removal of treated articles from the apparatus and closing the apparatus;

c) heating the adsorbent and passing a gas stream from the apparatus through said at least one adsorber containing the adsorbent and recycling the outlet stream from the adsorber directly to the apparatus.

The outlet gas stream from the adsorber is not condensed.

Further aspects of the present invention are various embodiments of an apparatus which is useful for carrying out the method of the present invention. In some embodiments the apparatus contains a treating chamber and a gas lock. The advantages of a gas lock in the apparatus of the present invention are indicated further below.

Accordingly, one embodiment of the apparatus of the present invention contains a treating chamber, a gas lock, at least one adsorber, a conduit system connecting the gas lock and the adsorber(s) and a pump.

In a second embodiment the apparatus contains a treating chamber, a gas lock, at least one adsorber, a conduit system, connecting a) the gas lock and said at least one adsorber and b) the treating chamber and said at least one adsorber, and a pump.

In some cases when carrying out the method of the present invention, it is useful to partially condense the solvent vapor before it is passed through the adsorber during the adsorption step a). In these cases an embodiment of the apparatus which is equipped with a condenser is used for carrying out the method of the present invention.

Accordingly, a further embodiment of the apparatus of the present invention contains a treating chamber, a gas lock, at least one adsorber, a condenser, a conduit system, a pump and a control system allowing the control of the gas circulation in said conduit system, wherein the condenser and the adsorber(s) are in parallel, the conduit system connects a) the gas lock and the condenser and b) the gas lock and the adsorber(s) and the control system is made in such a manner to allow gas circulation in the conduit system either i) from the gas lock to the condenser and from the condenser to the gas lock or ii) from the gas lock to the adsorber(s) and from the adsorber(s) to the gas lock.

Yet another embodiment of the apparatus of the present invention contains a treating chamber, a gas lock, at least one adsorber, a condenser, a conduit system, a pump and a control system allowing the control of the gas circulation in said conduit system, wherein the condenser and said at least one adsorber are in parallel, the conduit system connects a) the gas lock and the condenser, b) the gas lock and the adsorber(s) and c) the treating chamber and the adsorber(s) and the control system is made in such a manner to allow gas circulation in the conduit system either i) from the gas lock to the condenser and from the condenser to the gas lock or ii) from the gas lock to the adsorber(s) and from the adsorber(s) to the gas lock or iii) from the treating chamber to the adsorber(s) and from the adsorber(s) to the treating chamber.

Another embodiment of the apparatus does not contain a gas lock. It contains a treating chamber, a condenser, at least one adsorber, a conduit system connecting the treating chamber, condenser and adsorber(s), a pump and a control system allowing the control of gas circulation in the conduit system wherein an outlet conduit of the treating chamber is connected with an inlet conduit of the condenser and with an inlet conduit of the adsorber(s), an inlet conduit of the treating chamber is connected with an outlet conduit of the condenser and with an outlet conduit of the adsorber(s), the condenser and the adsorber(s) are in parallel and the control system is made in such manner to allow gas circulation in the conduit system either i) from the treating chamber to the condenser and from the condenser to the treating chamber or ii) from the treating chamber to the adsorber(s) and from the adsorber(s) to the treating chamber.

SHORT DESCRIPTION OF THE DRAWINGS

FIG. 6 is a diagrammatic illustration of yet another embodiment of the apparatus of the present invention.

DETAILED DESCRIPTION OF THE INVENTION

Figure 1:
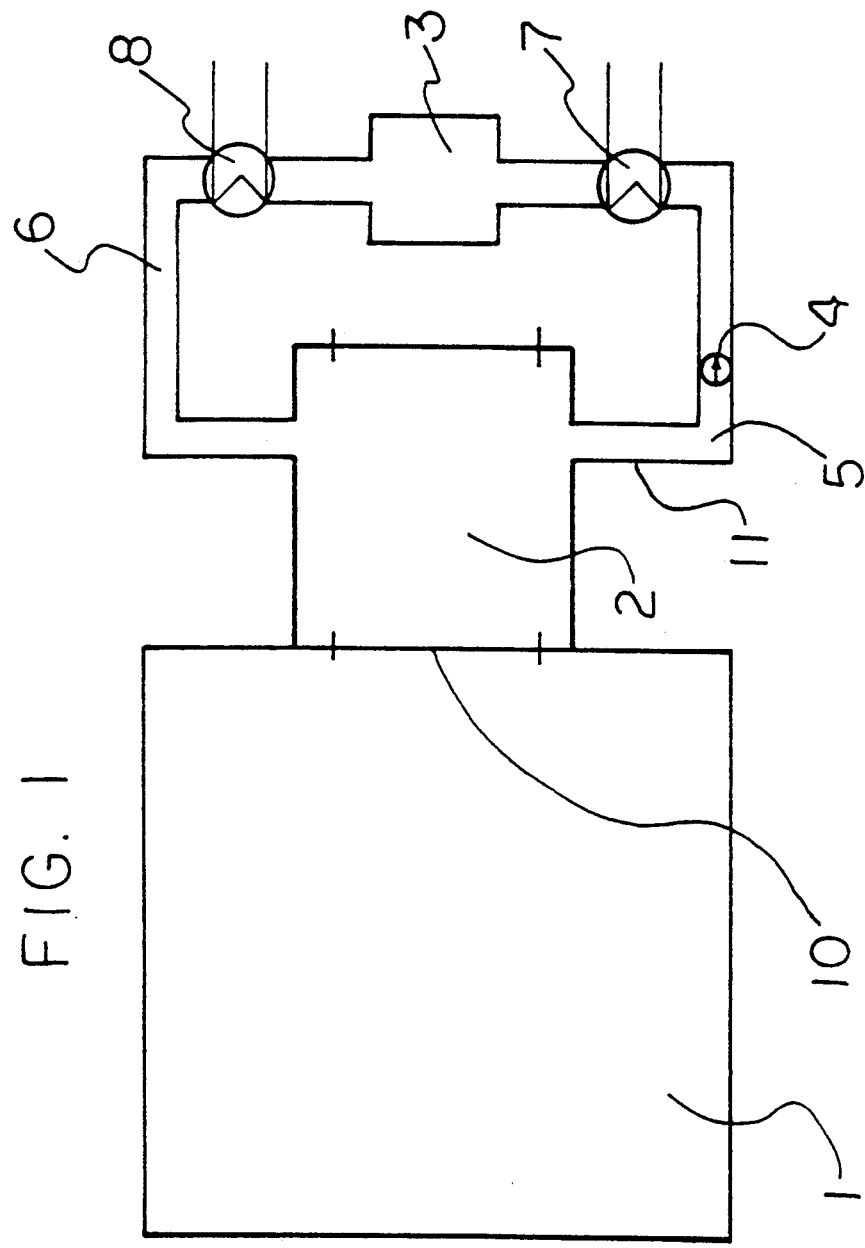
FIG. 1 is a diagrammatic illustration of one embodiment of the apparatus of the present invention.

The method of the invention is useful in any method of treating articles in a closed apparatus. Specifically, the method of the invention is useful in the cleaning of articles such as textiles, furs or leather, electronic parts or metals. It is particularly useful in the cleaning of metals or electronic parts such as the degreasing of metallic surfaces.

The method of the present invention is particularly useful if the solvents are hydrocarbons, typically having four or more carbon atoms, or a mixture of such hydrocarbons, such as gasoline, or partially or totally halogenated hydrocarbons, in particular chlorinated and/or fluorinated saturated and unsaturated hydrocarbons having one to three carbon atoms such as methylene chloride, 1,1,1-trichloroethane, carbon tetrachloride, 1,1,2,2-tetrachloroethene, perchloroethylene, trichloroethylene, trichloromonofluoromethane or trichlorotrifluoroethane. The solvent may also be a mixture of hydrocarbons, and partially or totally halogenated hydrocarbons.

In the following paragraphs a first embodiment of the method of the present invention is described, wherein the articles are treated in an apparatus containing a treating chamber and a gas lock. According to this embodiment of the method the solvent vapor which is mixed with air is obtained in the treatment of articles in the treating chamber, in step a) treated articles are passed from the treating chamber to the gas lock, the gas lock is isolated from the treating chamber and gaseous solvent vapor/air mixture is passed from the gas lock through the adsorber(s) and the outlet gas stream from the adsorber(s) is recycled to the gas lock; in step b) after completion of the adsorption, the gas lock is opened to enable removal of treated articles from the gas lock and in step c) the adsorbent is heated and a gas stream is passed from the treating chamber or from the gas lock through the adsorber(s) containing the adsorbent and the outlet stream from the adsorber(s) is directly recycled to the treating chamber or to the gas lock.

By "treating chamber" is meant any housing wherein the treatment of articles, such as a cleaning process, can take place. Such treating chambers are known in the art.

By "gas lock" is meant any container, such as a chamber, tank, storage device etc., which is provided with two opening/closing means, such as doors etc. which are substantially gas tight in the closed state. The gas lock is provided with a first or inside opening/closing means, such as a substantially gas tight door, which is located between the treatment chamber and the gas lock. The gas lock is further provided with a second or outside opening/closing means, such as a substantially gas tight door, which serves as a separation between the gas lock and the environment outside the apparatus of the invention. The apparatuses of the present invention preferably contain one gas lock, however, they may also be equipped with two or more gas locks. The following description relates to an apparatus which is only provided with one gas lock.

The articles are treated in the treating chamber. The treating chamber usually contains one or more containers, such as one or more tanks, containing the liquid organic solvent. The articles may be directly placed into the solvent or the articles may be placed in liquid-permeable containers, such as baskets, which are immersed into the solvent during the treatment of the articles. During the treatment of the articles, the first opening/closing means of the gas lock which is located between the gas lock and the treating chamber can be closed or open. The second opening/closing means of the gas lock is usually closed during the treatment of the articles. When the first opening/closing means is open, the second opening/closing means must be closed. After the treatment the articles are removed from the organic solvent.

After having treated the articles in the treatment chamber, they are placed into the gas lock via the first opening/closing means of the gas lock; the first opening/closing of the gas lock located between the gas lock and the treating chamber is then closed. The gas lock contains a gaseous vapor/air mixture originating from articles being not completely dry and/or from the gas exchange between the treating chamber and the gas lock when the first opening/closing means located between the gas lock and the treating chamber is open.

According to step a) of the method of the invention gaseous/solvent vapor mixture is passed from the gas lock through at least one adsorber. The adsorption step a) is described in detail further below.

After completion of the adsorption, the treated articles are removed from the gas lock and/or the gas lock is loaded with articles to be treated. The unloading and/or loading of the gas lock typically takes place via the opened second opening/closing means of the gas lock providing a substantially gas tight separation between the gas lock and the environment outside the apparatus of the invention. When carrying out the method of the present invention, the second opening/closing means should be closed when the first opening/closing means between the gas lock and the treating chamber is open and vice versa. In order to minimize the contamination of the environment with solvent vapor, it is essential that not both opening/closing means of the gas lock are open whenever the apparatus of the invention contains solvent vapor.

It is very advantageous if the method of the invention is carried out in an apparatus which not only contains a treating chamber but also a gas lock. The size of the treating chamber can be chosen in such a manner to allow an efficient treatment of the articles, even a large number of articles at the same time. The gas lock usually only serves as an outlet/inlet device for the articles which have been treated or which are to be treated. The size of the gas lock is chosen as small as possible but large enough to temporarily store the articles. Typically, the size of the gas lock is substantially smaller, for example from 5 to 30 times smaller, preferably from 8 to 25 times smaller, than the size of the treating chamber. Since the treated articles are placed into the gas lock and the treating chamber is closed by means of the first opening/closing means of the gas lock, only a relatively small gas volume in the gas lock has to be purified before the second opening/closing means is opened for unloading and/or loading purposes. Only a gas exchange between the gas lock and the environment takes place but not between the treating chamber and the environment. If the treated articles were directly removed from the treating chamber, the entire gas volume of the treating chamber would need to be purified in order to avoid an unduly high contamination of the environment when opening the treating chamber for unloading and/or loading purposes. Furthermore, removal of the solvent vapor in the treating chamber is impossible if the treating chamber contains open containers which are filled with liquid solvent.

Figure 2:
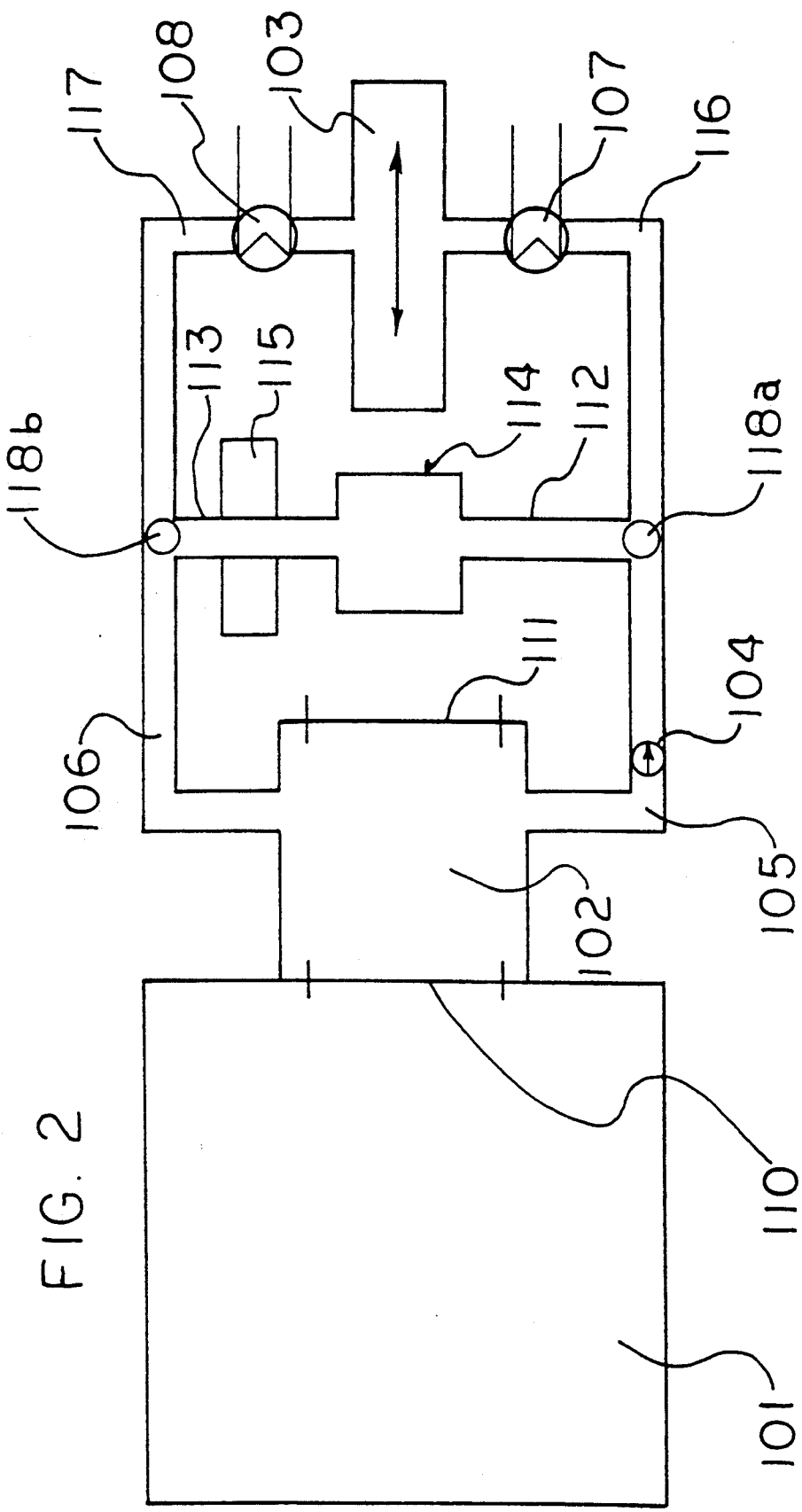
FIG. 2 is a diagrammatic illustration of another embodiment of the apparatus of the present invention.

Before carrying out the adsorption step a) according to the method of the invention, treated articles may be dried and the solvent vapor may be partially condensed in order not to load the adsorbent with very high amounts of solvent. If partial condensation is desired, the apparatus of the invention is provided with a condenser, for example as illustrated in FIG. 2 further below. Useful temperatures depend on the type of organic solvent and on the available condenser. For partially condensing halogenated hydrocarbons, the temperature usually is below 5° C., preferably below −10° C. and more preferably below −20° C. Solvent vapor is for example condensed by transferring solvent vapor/air mixture from the gas lock to a condenser and recycling the outlet stream from the condenser to the gas lock. A pump or ventilator is useful for cycling solvent vapor- /air mixture from the gas lock to the condenser and from the condenser back to the gas lock. If additional drying of the articles is desired, it is advisable to heat the solvent vapor/air mixture after having passed the condenser such that a warm solvent vapor/air mixture contacts the articles in the gas lock. The solvent vapor/air mixture may pass the condenser and the gas lock several times.

In step a) of the method of the invention, gaseous solvent vapor/air mixture is passed from the gas lock through an adsorber containing an adsorbent for the organic solvent. After solvent vapor/air mixture has passed through the adsorber, the outlet stream from the adsorber is recycled to the gas lock. The solvent vapor/air mixture is circulated by means of a pump or ventilator. If solvent vapor/air mixture is partially condensed prior to adsorption step a), the pump or ventilator used in adsorption step a) can be different from or the same as the one used for circulating solvent vapor/air mixture between the gas lock and the condenser. Solvent/vapor air mixture can be passed through the adsorber and recycled to the gas lock several times until the concentration of the solvent vapor is sufficiently low or the adsorbent is exhausted. If the adsorbent is exhausted before the concentration of the solvent vapor in the solvent vapor/air mixture is low enough, solvent vapor/air mixture can be passed through one or more further adsorbers which are arranged in a parallel fashion with respect to each other. Useful types of adsorbers are generally known. For example, in one useful type of adsorber the adsorbent is arranged in several individual portions in order to make an optimal use of the adsorbent capacity. The adsorbers can contain relatively short beds which are for example shorter than wide, seen in the direction the adsorption takes place. According to one preferred adsorption method, the adsorber containing the adsorbent for organic solvents is moved in a direction which is substantially perpendicular to the gas flow through the adsorber during the adsorption step. Such as adsorber is illustrated in FIG. 2 and makes an optimal use of the adsorbent capacity.

The adsorption of the organic vapor is conveniently carried out at about atmospheric pressure. The adsorption temperature preferably is below 50° C., more preferably below 30° C. The adsorption temperature usually is above −30° C., a temperature of from −20° C. to 20° C. being preferred. It may be advantageous to cool solvent vapor/air mixture before or during it passes through the adsorber and/or to heat the outlet gas stream of the adsorber.

Preferably, the adsorption is continued until a state of equilibrium is reached in the adsorbent at the chosen adsorption temperature.

When the adsorption of the solvent vapor is completed, in a second step b) the gas lock is opened and the treated articles can be removed from the gas lock and the gas lock can be loaded with articles to be treated, if desired.

In a further step c), the adsorbent is heated and a gas stream from the treating chamber or from the gas lock is passed through the adsorber(s) containing the adsorbent. The outlet stream from the adsorber(s) is directly recycled to the treating chamber or to the gas lock. Preferably, the gas stream is circulated between the gas lock and the adsorber(s). In this case the method of the invention can be carried out in a very simple apparatus which does not need to contain a conduit system which connects the treating chamber and the adsorber(s).

When circulating the gas stream between the gas lock and the adsorber(s), the second opening/closing means of the gas lock is closed prior to circulation in order to avoid release of the desorbed solvent vapor to the environment. The adsorbent may be heated before or preferably after closing of the second opening/closing means, but air circulation should only be started after having closed the second opening/closing means, i.e. the outside door, of the gas lock. Air circulation is preferably started during or after heating of the adsorbent. Preferably, air is circulated for desorbing (regenerating) the adsorbent until a state of equilibrium is reached in the adsorbent at the chosen desorption temperature. The equilibrium mainly depends on the desorption temperature and on the solvent vapor concentration in the gas stream used for desorbing the adsorber. The maximum solvent vapor concentration in the gas stream used for desorbing the adsorber is such that the equilibrium loading of the adsorbent at the desorption temperature is lower than the equilibrium loading of the adsorbent at the adsorption temperature at the end of the adsorption cycle. If the solvent vapor concentration in the treating chamber is too high, in any event the gas stream is circulated between the gas lock and the adsorber(s) in the desorption step.

The regeneration of the adsorbent can be carried out in a similar manner as the adsorption described above except that the temperature of the adsorbent is higher. The gas stream can flow during the desorption step in the same direction as in the adsorption step, however, it can also flow in the opposite direction (counter-current flow). A temperature of more than 70° C., in particular of 80° C. or more, is preferred in order to achieve a reasonable desorption rate. The desorption temperature is generally below 170° C. In the case of halogenated hydrocarbons or halocarbons, it is recommended that the desorption temperature be not more than 120° C., preferably not more than 110° C. The increased temperature may be achieved by heating the air by means of a known heater before it passes through the adsorber. Alternatively, the adsorbent can be directly heated. A known heat exchanger may be used for heating the adsorbent. Such a heat exchanger may for example make use of a hot/cold water system for controlling the temperature in the adsorbent.

If several adsorbers have been used for adsorbing the solvent vapor in the adsorption step a), generally that adsorber is desorbed first which has been used as the last one in the adsorption process; that means that the adsorbers are desorbed in the opposite sequence, compared to the sequence in which they are used for adsorption purposes. The solvent vapor obtained from the desorption of each adsorber is recycled to the treating chamber or to the gas lock via a direct conduit from each adsorber to the treating chamber or to the gas lock.

If in the method of the invention the solvent vapor is not partially condensed before passing the solvent vapor/air mixture from the gas lock through the adsorber(s) in the adsorption step a), the method can be carried out in a very simple apparatus. The apparatus can contain a simple conduit system which only allows gas circulation in one or two ways, said ways being i) gas lock - adsorber(s) - gas lock; or, optionally, ii) treating chamber - adsorber(s) - treating chamber.

Preferably, in the desorption step the gas is circulated between the gas lock and the adsorber(s) which allows the use of a very simple apparatus containing a conduit system which only allows the gas circulation between the gas lock and the adsorber(s).

Hereinbefore a method of the present invention has been described wherein the apparatuses for carrying out the method only contain one gas lock. However, as stated above, the apparatuses can be equipped with two or more gas locks. If an apparatus contains two gas locks, the articles to be treated can be passed into the treating chamber via the first gas lock and after the treatment and the adsorption step a) the articles can be removed from the treating chamber via the second gas lock. This embodiment of the method of the present invention allows a continuous operation of the apparatus. It is understood that the second opening/closing means, i.e. the outside doors, of both gas locks are only opened after the solvent vapor concentration in the gas locks has been reduced to an acceptable level in the adsorption step a) described above. The adsorption and desorption steps a) and c) described above can be but do not have to be carried out simultaneously for both gas locks. The apparatuses of the present invention can contain a conduit system which connects the first gas lock with a first adsorber system and which connects the second gas lock with a second adsorber system.

In the following paragraphs a second embodiment of the method of the present invention is described, wherein the articles are treated in a treating chamber to which no gas lock is arranged. According to this embodiment of the method the solvent vapor concentration is directly controlled in the treating chamber. According to this method the apparatus contains a treating chamber is which the articles are treated and in which the solvent vapor which is mixed with air is obtained, in step a) gaseous solvent vapor/air mixture is passed from the treating chamber through the adsorber(s) and the outlet stream from the adsorber(s) is recycled to the treating chamber; in step b) after completion of the adsorption, the treating chamber is opened to enable removal of treated articles from the treating chamber and in step c) the adsorbent is heated and a gas stream is passed from the treating chamber through the adsorber(s) containing the adsorbent and the outlet stream from the adsorber(s) is directly recycled to the treating chamber.

Figure 5:
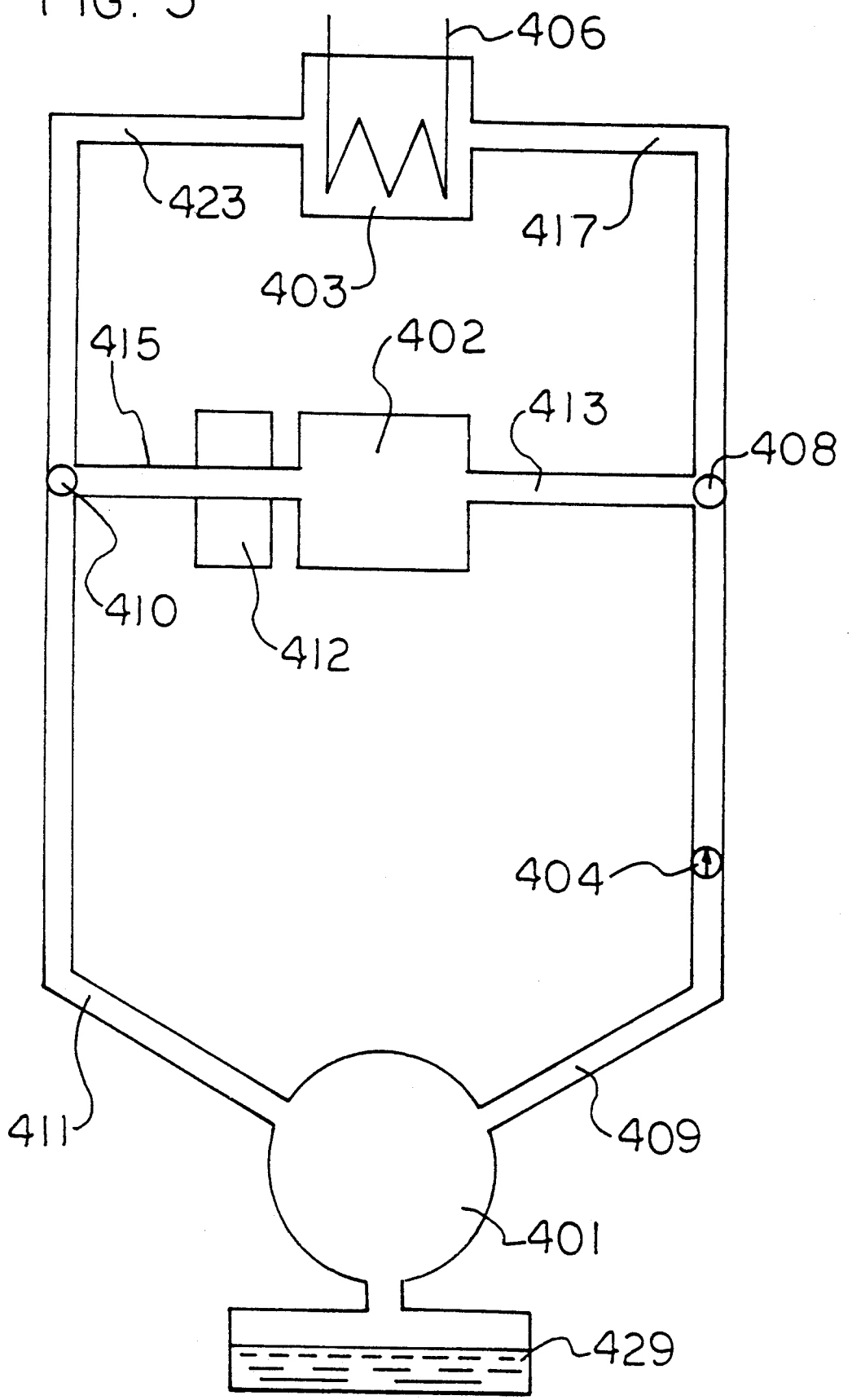
FIG. 5 is a diagrammatic illustration of yet another embodiment of the apparatus of the present invention.

Before carrying our the adsorption step a) according to the method of the invention, treated articles may be dried and the solvent vapor is preferably condensed as generally described above with reference to the first embodiment of the method of the present invention. Solvent vapor is for example condensed by transferring solvent vapor/air mixture from the treating chamber to a condenser and recycling the outlet stream from the condenser to the treating chamber. Two embodiments of an apparatus which is useful for carrying out the second embodiment of the method are illustrated in FIGS. 5 and 6.

In step a) of the method of the invention gaseous solvent vapor/air mixture is passed from the treating chamber to an adsorber containing an adsorbent for the organic solvent. After solvent vapor/air mixture has passed through the adsorber, the outlet stream from the adsorber is directly recycled to the treating chamber. The solvent vapor/air mixture is circulated by means of a pump or ventilator as generally described above with reference to the first embodiment of the method. Solvent/vapor air mixture can be passed through the adsorber and recycled to the treating chamber several times until the concentration of the solvent vapor is sufficiently low or the adsorbent is exhausted. If the adsorbent is exhausted before the concentration of the solvent vapor in the solvent vapor/air mixture is low enough, solvent vapor/air mixture can be passed through one or more further adsorbers which are arranged in a parallel fashion with respect to each other. The adsorption step a) can be carried out as described above with reference to the first method of the present invention.

When the adsorption of the solvent vapor is completed, in a second step b) the treating chamber is opened for loading and/or unloading the treating chamber. The treating chamber is then closed again. In step c) the adsorbent is heated and a gas stream from the treating chamber is passed through the adsorber(s) containing the heated adsorbent. The outlet stream from the adsorber(s) is directly recycled to the treating chamber. The adsorbent may be heated before or preferably after closing of the treating chamber, but air circulation should only be started after having closed the treating chamber. The regeneration desorption of the adsorbent can be carried out in the same manner and at the same temperatures as the desorption described above with reference to the first embodiment of the method.

Whatever embodiment of the method of the present invention is chosen, the gas stream being released from the adsorber(s) in the desorption step is directly recycled to the treating chamber or gas lock without condensing a portion of the solvent vapor before the gas stream enters the treating chamber or the gas lock. Accordingly, the method of the invention comprises a very simple desorption step which does not have the disadvantages of the desorption step in known methods which make use of a condensation. The main disadvantages of the usual condensation in known methods are for example a complicated system of controlling the gas flow, the consumed energy for cooling and condensing the desorbed solvent vapor and the necessity of handling the condensed organic solvent in an additional step.

Several types of adsorbents can be comprised in the adsorbers. Useful adsorbents are for example activated carbon, molecular sieves, silica gel, adsorptive or absorptive resins.

The most preferred adsorptive resins are adsorptive porous resin beads which have been prepared by swelling purified haloalkylated, cross-linked beads of a copolymer comprising units of i) styrene or an alkylstyrene (for example a $C_1$–$C_3$ alkylstyrene such as alpha-methyl styrene) and ii) divinylbenzene and/or trivinylbenzene in an inert organic liquid and post-cross-linking the swollen beads in the presence of a Friedel-Crafts catalyst. The haloalkylated cross-linked copolymer beads of i) styrene or an alkylstyrene and ii) divinylbenzene and/or trivinylbenzene which are used for post-cross-linking to form the adsorptive porous resin beads are a well-known class of materials as exemplified by U.S. Pat. Nos. 4,297,220, 4,564,644 and 4,3829124. The swelling and post-cross-linking in the presence of a Friedel-Crafts catalyst is generally known from East German patent application DD-A-249,703. Those adsorptive porous resin beads are particularly suitable for adsorbing halocarbons or halogenated hydrocarbons that are microporous and are made i) from 99.8 to 98.2 percent, preferably from 99.7 to 98.5 percent and more preferably from 99.5 to 99.0 percent styrene or an alkylstyrene and ii) from 0.2 to 1.8 percent, preferably from 0.3 to 1.5 percent and more preferably from 0.5 to 1.0 percent divinylbenzene, based on the total weight of i) and ii). The microporous copolymer beads have an average pore diameter of up to 2.8 nm, preferably from 0.5 to 2.5 nm, more preferably from 1 to 2 nm.

The required amount of adsorbent mainly depends on i) the volume of the gas lock (in the first embodiment of the method) or the volume of the treating chamber (in the second embodiment of the method), ii) the partial pressure of the solvent vapor to be adsorbed in the adsorption step a), iii) the adsorption and desorption temperatures in steps a) and c), iv) the required solvent vapor concentration in the outlet stream from the adsorber in the adsorption step a) and v) the type of solvent vapor and adsorbent.

The process of the present invention is very simple and avoids the contact of steam with the solvent in the desorption step c). Furthermore, apart from loading and/or unloading the gas lock (in the first embodiment of the method) or the treating chamber (in the second embodiment of the method), the system is closed.

In the process described in U.S. Pat. No. 4,583,985 the whole amount of outlet gases from the adsorber is directly released to the environment which is not the case in the present invention. According to the present invention the adsorbed solvent vapors need not be recovered or disposed of but they are only temporarily stored in the adsorber(s). The present invention mainly makes use of the adsorbent as a temporary storage system due to its different capacities at different temperatures.

Since the desorbed organic solvents are not condensed in a condenser but are directly recycled to the treating chamber or gas lock, a less sophisticated system for controlling the gas flow is required than in the dry cleaning machine disclosed in German patent 36 09 587.

Furthermore, when condensing the desorbed organic solvents, the hot gas obtained by regeneration of the adsorbent must contain a high partial pressure of organic solvent vapors in order to achieve a sufficient condensation. In the method of the present invention, the gas obtained from the regeneration of the adsorbent needs not to fulfill such requirements.

Furthermore, the organic solvent which is obtained in the common step of condensing desorbed solvent vapors after the desorption, for example as disclosed in German patent 36 09 587, has to be removed and handled in a separate step, for example by recycling or disposing of the condensed organic solvent. This additional step adds to the costs of known cleaning operations. According to the method of the present invention such an additional step is not necessary.

The apparatuses and method of the present invention are further illustrated with reference to the drawings. The expressions "outlet" and "inlet" conduit, end etc. as used further below relate to the direction of the gas circulation during the adsorption step a) of the method of the invention.

Referring now to FIG. 1, one embodiment of the apparatus of the present invention comprises a treating chamber 1, a gas lock 2, an adsorber 3, a pump or ventilator 4 (i.e., a device for circulating the various gases in the system), a conduit system connecting the gas lock and the adsorber and a control system allowing the control of gas circulation in the said conduit system. The conduit system contains an outlet conduit 5 of the gas lock 2 which is connected with the inlet end of the adsorber 3. The conduit system further comprises an inlet conduit 6 of the gas lock 3 which is connected with the outlet end the adsorber 3. The control system for controlling the gas circulation is very simple, either it allows the gas circulation between the gas lock 2 and the adsorber 3 or it interrupts the gas circulation. The control system typically consists of a set of two valves, such as known butterfly valves, located in the outlet conduit 5 and the outlet conduit 6 of the gas lock. The useful types of valves and their suitable positions in the conduit system for allowing the gas circulation are known in the art and therefore not discussed in great detail.

Typically the apparatus of the present invention also comprises one or more cleaning tanks comprising a liquid solvent which are located in the treating chamber 1. Cleaning tanks are known in the art and not further described herein.

The gas lock 2 is provided with a first or inside opening/closing means 10 located between the gas lock and the treating chamber 1 and with a second or outside opening/closing means 11 which is suitable for removing treated articles from the apparatus or for placing articles to be treated into the apparatus of the invention.

It is advisable to arrange the pump 4 in the conduit system between the outlet end of the gas lock 2 and the inlet end of the adsorber 3, as shown in FIG. 1.

Advantageously, a cooler 7 is located in the conduit system close to the inlet end of the adsorber 3 and a heater 8 is located close to the outlet end of the adsorber. Alternatively, the adsorber 3 may be provided with a heat exchanger. Adsorbers comprising a heat exchanger are known in the art.

Advantageously, the apparatus of the invention contains a means for pressure compensation (not shown) in order to compensate for the pressure reduction/pressure increase due to the cooling/heating of the gases in the apparatus. The means for pressure compensation can be arranged to the gas lock or to the treating chamber or to both. Means for pressure compensation, for example bellows, surge tanks, or tanks with floating heads are generally known and not described here in full detail.

Preferably, the apparatus of the invention also contains a means of measuring the solvent vapor concentration in the solvent vapor/air mixture in the conduit system close to the inlet and outlet end of the adsorber 3.

When the apparatus illustrated by FIG. 1 is in operation, articles are treated in the treating chamber 1. Either the first opening/closing means 10 or the second opening/closing means 11 or both are closed. Before opening the first opening/closing means, the second opening/closing means must be closed. When the treatment of the articles is complete, they are passed from the treating chamber 1 to the gas lock 2 via the opened first opening/closing means 10. The first opening/closing means is then closed and solvent vapor/air mixture is circulated from the gas lock 2 to the adsorber 3 and back to the gas lock 2 by means of the pump 4 in the direction indicated by the arrow in FIG. 1. If desired, the gas stream may be cooled before entering the adsorber by means of a cooler 7 and/or may be heated after having passed the adsorber by means of a heater 8. After sufficient adsorption, the second opening/closing means 11 is opened for unloading/loading purposes and closed again. The loaded adsorber is then desorbed at an increased temperature. In the desorption step the gas stream is circulated co-currently or counter-currently, compared to its flow direction in the previous adsorption step. The circulating gas stream is heated by means of the heater 8. Alternatively, the adsorbent may be directly heated by means of a heat exchanger (not shown).

Referring now to FIG. 29 another embodiment of the apparatus of the present invention comprises a treating chamber 101, a gas lock 102, an adsorber 103, a pump or ventilator 104 (i.e., a device for circulating the various gases in the system), a condenser 114, a conduit system connecting the gas lock, the condenser and the adsorber and a control system allowing the control of gas circulation in the said conduit system. The conduit system contains an outlet conduit 105 of the gas lock 102 which is connected with an inlet conduit 112 of the condenser and with an inlet conduit 116 of the adsorber 103. The conduit system further comprises an inlet conduit 106 of the gas lock 103 which is connected with an outlet conduit 113 of the condenser and with an outlet conduit of 117 of the adsorber 103. The control system allows two ways of gas circulation in the conduit system connecting the gas lock, the condenser and the adsorber, that is either i) gas lock condenser - gas lock or
ii) gas lock adsorber - gas lock.

The adsorber and the condenser are in parallel. The control system typically consists of a set of valves, such as known three-way valves. The useful types of valves and their suitable positions in the conduit system for allowing the said two ways of gas circulation are known in the art and therefore not discussed in great detail. For example, a first three-way valve 118a is located at the junction point of the outlet conduit 105 of the gas lock, the inlet conduit 112 of the condenser and the inlet conduit 116 of the adsorber. A second three-way valve 118b is located at the junction point of the inlet conduit 106 of the gas lock, the outlet conduit 113 of the condenser and the outlet conduit 117 of the adsorber.

Typically the apparatus of the present invention also comprises one or more cleaning tanks comprising a liquid solvent which are located in the treating chamber 101. Cleaning tanks are known in the art and not further described herein.

The gas lock 102 is provided with a first or inside opening/closing means 110 located between the gas lock and the treating chamber 101 and with a second or outside opening/closing means 111 which is suitable for removing treated articles from the apparatus or for placing articles to be treated into the apparatus of the invention.

It is advisable to arrange the pump 104 in the conduit system between the gas lock 102 and the junction point of the outlet conduit 105, the inlet conduit 112 and the inlet conduit 1169 as shown in FIG. 2. If desired, the cleaning apparatus may be provided with a further ventilator (not shown) located between the adsorber 103 and the junction point of the outlet conduit 105, the inlet conduit 112 and the inlet conduit 116.

Advantageously, a cooler 107 is located in the inlet conduit 116 of the adsorber 103 and a heater 108 is located in the outlet conduit 117 of the adsorber. Alternatively, the adsorber 103 may be provided with a heat exchanger. Adsorbers comprising a heat exchanger are known in the art.

A heater 115 is advantageously arranged between the condenser 114 and the junction point of the inlet conduit 106 of the gas lock, the outlet conduit 113 of the condenser and the outlet conduit 117 of the adsorber. A heater is particularly suitable in the dry-cleaning of textiles when the solvent vapor/air mixture circulates between the gas lock and the condenser and this mixture is reheated after having passed the condenser for further drying of the articles in the gas lock. The condenser should be provided with a means for removing the recovered organic solvent from the adsorber. Such means, for example an outlet tube, are known.

Like the apparatus illustrated by FIG. 1, the apparatus illustrated by FIG. 2 advantageously contains a means for pressure compensation (not shown) in order to compensate for the pressure reduction/pressure increase due to the cooling/heating of the gases in the apparatus and a means of measuring the solvent vapor concentration in the solvent vapor/air mixture in the inlet conduit 116 and the outlet conduit 117 of the adsorber 103.

When the apparatus illustrated by FIG. 2 is in operation, articles are treated in the treating chamber 101 as described with reference to FIG. 1. When the treatment of the articles is completed, they are passed from the treating chamber 101 to the gas lock 102 via the opened first opening/closing means 110. The second opening/closing means 111 has been closed before opening the first opening/closing means 110. The first opening/closing means is then closed and solvent vapor/air mixture is circulated from the gas lock 102 to the condenser 114 and back to the gas lock 102 by means of the pump 104 in the direction indicated by the arrow in FIG. 2 or in the opposite direction.

After sufficient gas circulation and condensation of solvent vapor, solvent vapor/air mixture is circulated from the gas lock 102 to the adsorber 103 and back to the gas lock 102 by means of the pump 104 in the direction indicated by the arrow in FIG. 2. If desired, the gas stream may be cooled before entering the adsorber by means of a cooler 107 and/or may be heated after having passed the adsorber by means of a heater 108. As illustrated by FIG. 2, the adsorber 103 is moved in a direction which is substantially perpendicular to the gas flow through the adsorber 103 during the adsorption step. It is understood that this embodiment of the adsorber is not only useful for the apparatus of the invention as illustrated by FIG. 2 but in all apparatuses of the present invention.

After sufficient adsorption, the second opening/closing means is opened for unloading/loading purposes and closed again. The loaded adsorber is then desorbed at an increased temperature. In the desorption step the gas stream is circulated concurrently or counter-currently, compared to its flow direction in the previous adsorption step. The circulating gas stream is heated by means of the heater 108. Alternatively, the adsorbent may be directly heated by means of the heat exchanger (not shown). During the desorption step the adsorber 103 is moved in a direction which is substantially perpendicular to the gas flow through the adsorber 103 during the desorption step and which is opposite to the movement of the adsorber in the adsorption step.

Figure 3:
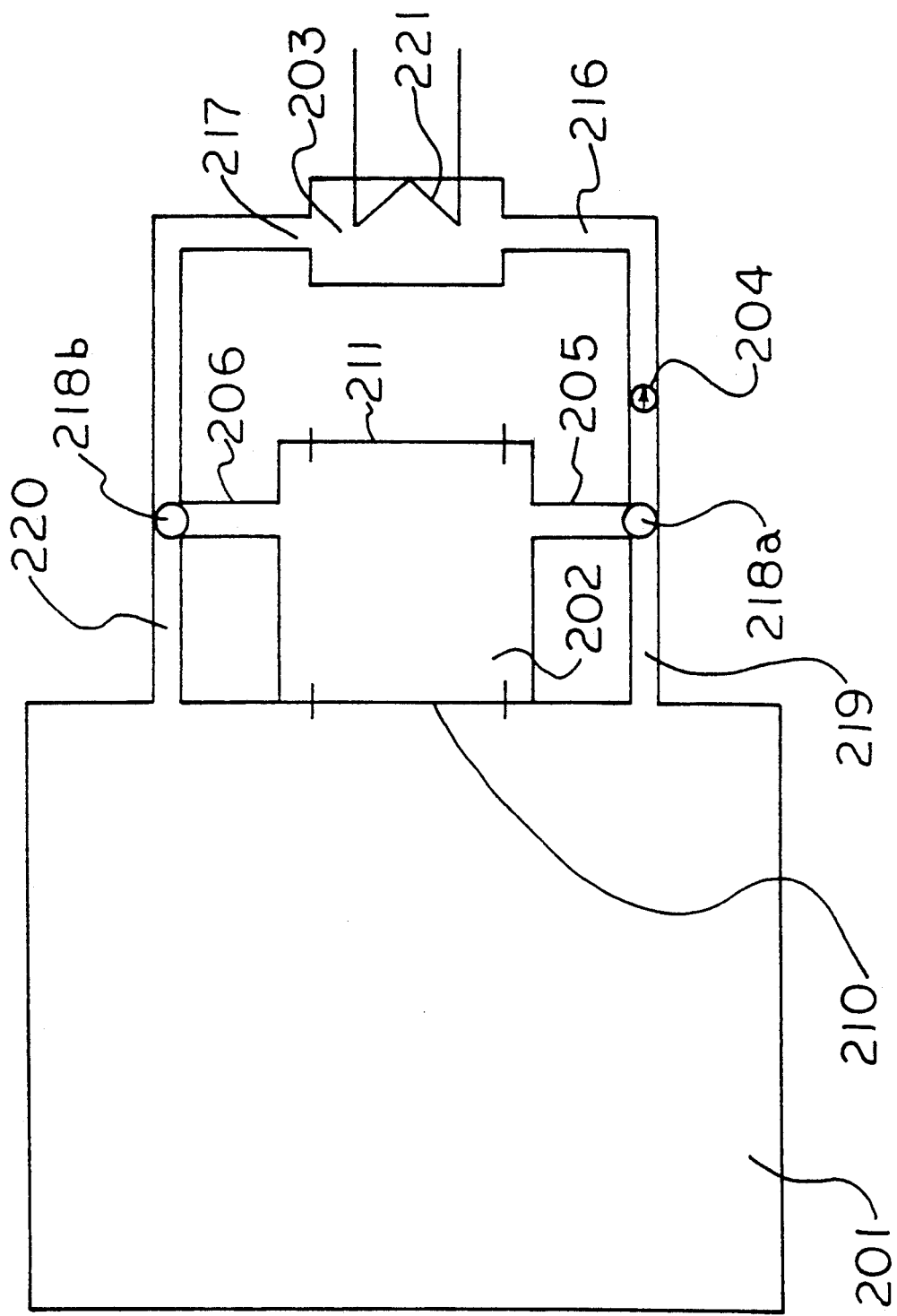
FIG. 3 is a diagrammatic illustration of yet another embodiment of the apparatus of the present invention.

Referring now to FIG. 3, another embodiment of the apparatus of the present invention comprises a treating chamber 201, a gas lock 202, an adsorber 203, a pump or ventilator 204, a conduit system connecting a) the gas lock and the adsorber and b) the treating chamber and the gas lock as well as a control system allowing the control of gas circulation in the said conduit system. The conduit system contains an outlet conduit 219 of the treating chamber 201 which is connected with an inlet conduit 216 of the adsorber and an outlet conduit 205 of the gas lock 202 which is also connected with the inlet conduit 216 of the adsorber 203. The conduit system further comprises an inlet conduit 220 of the treating chamber 201 which is connected with an outlet conduit 217 of the adsorber 203 and an inlet conduit 206 of the gas lock 202 which is also connected with the outlet conduit of the adsorber 203. The control system allows two ways of gas circulation: either i) gas lock - adsorber - gas lock or ii) treating chamber - adsorber - treating chamber. The control system typically consists of a set of valves, such as known three-way valves. For example, a first three-way valve 218a is located at the junction point of the outlet conduit 205 of the gas lock, the outlet conduit 219 of the treating chamber and the inlet conduit 216 of the adsorber. A second three-way valve 218b is located at the junction point of the inlet conduit 206 of the gas lock, the inlet conduit 220 of the treating chamber and the outlet conduit 217 of the adsorber.

The gas lock 202 is provided with a first or inside opening/closing means 210 and with a second or outside opening/closing means 211 as described above with reference to FIG. 1.

The adsorber 203 is provided with a heat exchanger 221. Adsorbers comprising a heat exchanger are known in the art. Alternatively, a heater and cooler may be located close to the adsorber 203, for example as illustrated in FIGS. 1 and 2.

Typically the apparatus of the present invention also comprises one or more cleaning tanks, a means for pressure compensation and a means of measuring the solvent vapor concentration in the solvent vapor/air mixture as described above with reference to FIG. 1.

When the apparatus illustrated by FIG. 3 is in operation, articles are treated in the treating chamber 201 and passed from the treating chamber 210 to the gas lock 202 as described above with reference to FIG. 1. The adsorption step is carried out by circulating the solvent vapor/air mixture from the gas lock 202 to the adsorber 203 and back to the gas lock 202 by means of the pump 204 as described above with reference to FIG. 1. After sufficient adsorption, the second opening/closing means 211 is opened for unloading/loading purposes and closed again.

The loaded adsorber is then desorbed at an increased temperature by circulating at least once a gas stream from the treating chamber 201 to the adsorber 203 containing a heated adsorbent and recycling the outlet gas stream from the adsorber 203 back to the treating chamber 201. In the desorption step the gas stream is circulated co-currently or counter-currently, compared to its flow direction in the previous adsorption step. The adsorbent is heated by means of the heat exchanger 221.

Figure 4:
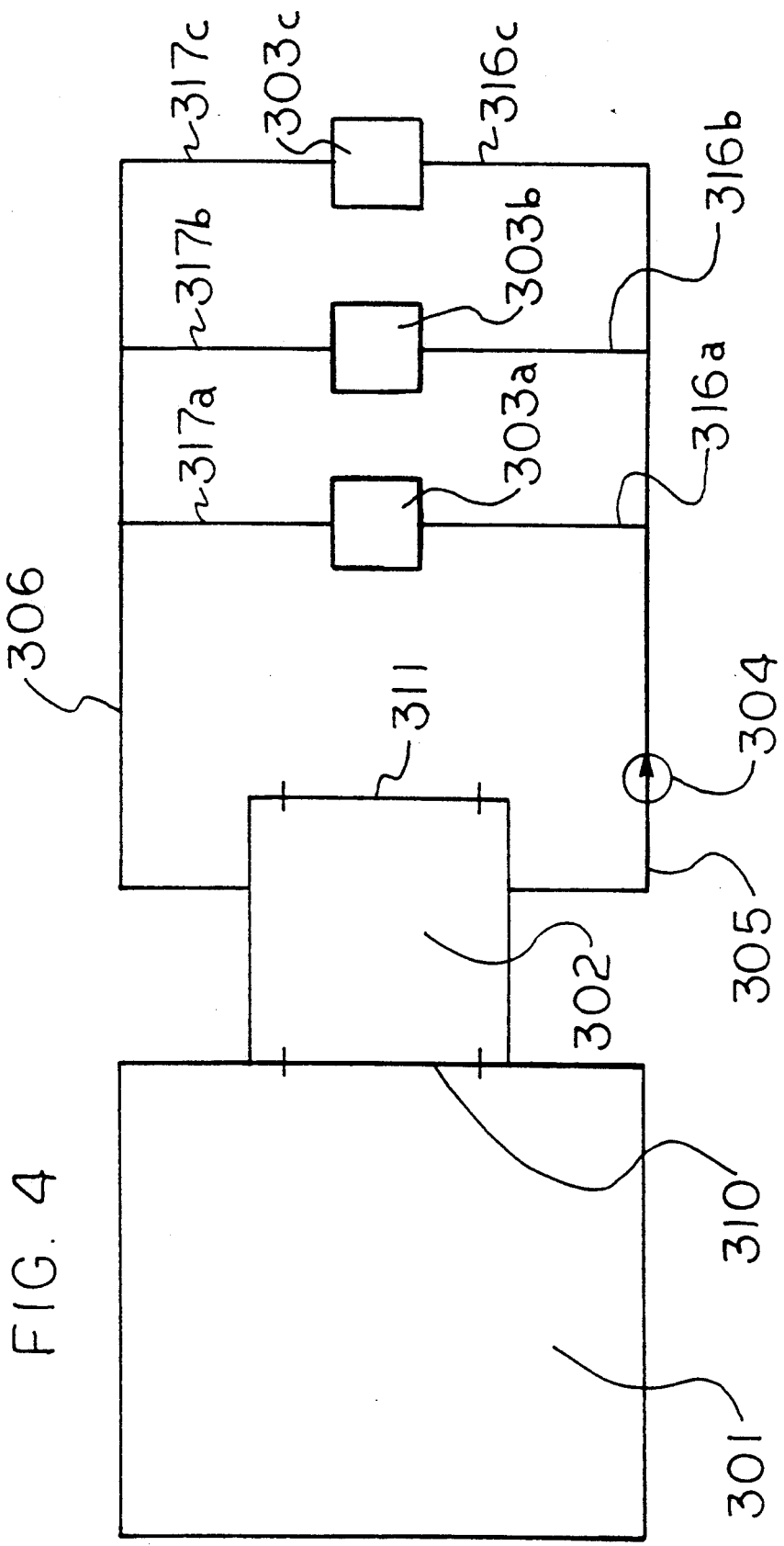
FIG. 4 is a diagrammatic illustration of yet another embodiment of the apparatus of the present invention.

Referring now to FIG. 4, FIG. 4 illustrates that the apparatus may contain several adsorbers in parallel (three adsorbers are shown). The apparatus contains a treating chamber 301, a gas lock 302 being provided with two opening/closing means 310 and 311, adsorbers 303a, 303b and 303c and a pump or ventilator 304. The valve system which allows the circulation of the gas stream from the gas lock 302 over the first adsorber 303a or over the second adsorber 303b or over the third adsorber 303c and back to the gas lock 302 is known and not shown in FIG. 4. The outlet conduit 305 of the gas lock 302 is connected with the inlet conduits 316a, 316b and 316c of the adsorbers 303a, 303b and 303c. The inlet conduit 306 of the gas lock 032 is connected with the outlet conduit conduits 317a, 317b and 317c of the adsorbers 303a, 303b and 303c.

In operation, the cleaning apparatus illustrated by FIG. 4 essentially works in the same way as the cleaning apparatus illustrated by FIG. 1. In the adsorption step, the solvent vapor/air mixture is circulated from the gas lock 302 to the adsorber 303a and back to the gas lock 302 by means of the ventilator 304. If the adsorbent in adsorber 303a is exhausted prior to sufficient adsorption of the organic solvent, the solvent vapor/air mixture is circulated from the gas lock 302 to the adsorber 303b and back to the gas lock. If desired, the solvent vapor/air mixture is also circulated from the gas lock 302 to a third adsorber 303c and back to the gas lock. The apparatus may contain additional adsorbers which are not shown in FIG. 4. In the desorption step, generally the adsorbent in adsorber 303c is first desorbed, then the adsorbent in adsorber 303b and last the adsorbent in adsorber 303a by circulating a gas stream from the gas lock 302 at least once through the adsorbers and back to the gas lock. The temperature in the adsorbers is increased in the manner described above with reference to FIGS. 1, 2 or 3.

Referring now to FIG. 5, another embodiment of the apparatus of the present invention comprises a treating chamber 401, a condenser 2, an adsorber 403, a pump or ventilator 404, a conduit system connecting the treating chamber, condenser and the adsorber and a control system allowing the control of gas circulation in the said conduit system. The conduit system contains an outlet conduit 409 of the treating chamber 401 which is connected with an inlet conduit 413 of the condenser 402 and with an inlet conduit 417 of the adsorber 403. The conduit system further comprises an inlet conduit 411 of the treating chamber 401 which is connected with an outlet conduit 415 of the condenser 402 and with an outlet conduit 423 of the adsorber 403. The control system allows two ways of gas circulation in the conduit system connecting the treating chamber, condenser and adsorber, that is either (I) treating chamber - condenser treating chamber or (II) treating chamber - adsorber treating chamber. The adsorber and the condenser are in parallel. The control system typically consists of a set of valves, such as known three-way valves. The useful types of valves and their suitable positions in the conduit system for allowing the said two ways of gas circulation are known in the art and therefore not discussed in great detail. For example, a first three-way valve 408 is located at the junction point of the outlet conduit 409 of the treating chamber, the inlet conduit 413 of the condenser and the inlet conduit 417 of the adsorber. A second three-way valve 410 is located at the junction point of the inlet conduit 411 of the treating chamber, the outlet conduit 415 of the condenser and the outlet conduit 423 of the adsorber.

Typically the apparatus of the present invention also comprises a liquid tank 429 which is connected with the treating chamber 401. Liquid tanks including connections to treating chambers and liquid pumps are known in the art and not further described herein.

It is advisable to arrange the pump 404 in the conduit system between the treating chamber 401 and the junction point of the outlet conduit 409, the inlet conduit 413 and the inlet conduit 417, as shown in FIG. 5. If desired, the apparatus may be provided with a further pump (not shown) located between the adsorber 403 and the junction point of the outlet conduit 409, the inlet conduit 413 and the inlet conduit 417. The adsorber 403 is provided with a heat exchanger 406. Adsorbers comprising a heat exchanger are known in the art. Alternatively, a heater and a cooler may be located close to the adsorber 403, for example as illustrated in FIGS. 1 and 2.

A heater 412 is advantageously arranged between the condenser 402 and the junction point of the inlet conduit 411 of the treating chamber, the outlet conduit 415 of the condenser and the outlet conduit 423 of the adsorber, as generally described with reference to FIG. 2.

Like the apparatus illustrated by FIG. 1, the apparatus illustrated by FIG. 5 advantageously contains a means for pressure compensation (not shown) and a means of measuring the solvent concentration in the solvent vapor/air mixture.

When the apparatus illustrated by FIG. 5 is in operation, in the drying phase of the treating process the liquid solvent in the treating chamber 401 is pumped to the liquid tank 429 after having washed the articles in the treating chamber. Solvent vapor/air mixture is circulated from the treating chamber 401 to the condenser 402 and back to the treating chamber 401 by means of the pump 404 in the direction indicated by the arrow in FIG. 5. After sufficient gas circulation and condensation of solvent vapor, solvent vapor/air mixture is circulated from the treating chamber 401 to the adsorber 403 and back to the treating chamber 401 by means of the pump 404. After sufficient adsorption, the treating chamber 401 is opened for loading/unloading purposes and closed again. The adsorbent is heated by means of a heat exchanger 406 and air is circulated from the treating chamber 401 to the adsorber 403 and back to the treating chamber 401. The treating chamber is then ready again for treating articles. During the treating of articles the pump 404 is out of operation. The apparatus should be provided with known means (not shown) for preventing solvent vapors from escaping via the inlet pipe 411 and the outlet pipe 409 of the treating chamber 401 during the washing phase of the treating process. By using two three-way valves 408, 410 for controlling the gas circulation in the circuits (I) treating chamber - condenser - treating chamber and (II) treating chamber - adsorber(s) - treating chamber, solvent vapors can be prevented from escaping from the cleaning chamber into the condenser or adsorber.

Referring now to FIG. 6, FIG. 6 illustrates yet another embodiment of the apparatus of the present invention. The apparatus comprises a cleaning chamber 501, a condenser 502, adsorbers 503, 505, 507 and a pump or ventilator 504. The outlet conduit 509 of the treating chamber 501 is connected with the inlet conduit 513 of the condenser 502 and with the inlet conduit 517, 519 and 521 of the adsorbers 503, 505 and 507. The inlet conduit 511 of the treating chamber 501 is connected with the outlet conduit 515 of the condenser 502 and with the outlet conduit 523, 525, 527 of the adsorbers 503, 505, and 507.

In operation, the apparatus illustrated by FIG. 6 essentially works in the same way as apparatus illustrated by FIG. 5. In the adsorption step, solvent vapor/air mixture is circulated from the treating chamber 501 to the adsorber 503 and back to treating chamber 501 by means of the ventilator 504. If the adsorbent in adsorber 503 is exhausted prior to sufficient adsorption of the organic solvent, solvent vapor/air mixture is circulated from the treating chamber 501 to the adsorber 505 and back to the treating chamber. If desired, solvent vapor/air mixture is also circulated from the treating chamber 501 to a third adsorber 507 and back to treating chamber 501. The cleaning apparatus may contain additional adsorbers which are not shown in FIG. 6. In the desorption step, generally the adsorbent in adsorber 507 is first desorbed, then the adsorbent in adsorber 505 and last the adsorbent in adsorber 503 by passing air from the treating chamber through the adsorbers.

What is claimed is:

1. A method of controlling the solvent vapor concentration in an apparatus which solvent vapor is mixed with air and is obtained in the treatment of articles in a treating chamber of the apparatus comprising the following steps:
    a) in an adsorption step passing gaseous solvent vapor/air mixture from the treating chamber or a gas lock of the apparatus through at least one adsorber containing an adsorbent for the organic solvent and recycling the outlet gas stream from the adsorber to the treating chamber or the gas lock of the apparatus;
    b) after completion of the adsorption, opening the apparatus to enable removal of treated articles and closing the apparatus;
    c) heating the adsorbent and passing a gas stream from the treating chamber or the gas lock of the apparatus through said at least one adsorber containing the adsorbent and recycling the outlet stream from the adsorber directly to the treating chamber or the gas lock of the apparatus without condensation of said outlet stream before it enters the treating chamber or the gas lock of the apparatus.

2. The method of claim 1 wherein the apparatus contains a treating chamber and a gas lock and the solvent vapor which is mixed with air is obtained in the treatment of articles in the treating chamber, in step a) treated articles are passed from the treating chamber to the gas lock, the gas lock is isolated from the treating chamber and gaseous solvent vapor/air mixture is passed from the gas lock through said at least one adsorber and the outlet gas stream from the adsorber is recycled to the gas lock; in step b) after completion of the adsorption, the gas lock is opened to enable removal of treated articles from the gas lock and in step c) the adsorbent is heated and a gas stream is passed from the treating chamber or from the gas lock through said at least one adsorber containing the adsorbent and the outlet stream from the adsorber is directly recycled to the treating chamber or to the gas lock without condensation of said outlet stream before it enters the treating chamber or the gas lock.

3. The method of claim 1 wherein the apparatus contains a treating chamber in which the articles are treated and in which the solvent vapor which is mixed with air is obtained, in step a) gaseous solvent vapor/air mixture is passed from the treating chamber through said at least one adsorber and the outlet stream from the adsorber is recycled to the treating chamber; in step b) after completion of the adsorption, the treating chamber is opened to enable removal of treated articles and in step c) the adsorbent is heated and a gas stream is passed from the treating chamber through said at least one adsorber containing the adsorbent and the outlet stream from the adsorber is directly recycled to the treating chamber without condensation of said outlet stream before it enters the treating chamber.

4. The method of claim 1 wherein in step a) the temperature of the gaseous vapor/air mixture that passes said at least one adsorber is below about 50° C.

5. The method of claim 1 wherein in step a) the temperature of the gaseous vapor/air mixture that passes said at least one adsorber is below about 30° C.

6. The method of claim 1 wherein in step c) the adsorbent is heated to a temperature of more than about 70° C.

7. The method of claim 1 wherein in step c) the adsorbent is heated to a temperature of from about 80° C. to about 120° C.

8. The method of claim 1 wherein said at least one adsorber containing an adsorbent for organic solvents is moved in a direction being substantially perpendicular to the gas flow through the adsorber.

9. The method of claim 1 wherein the solvent vapor is partially condensed before it is passed through said at least one adsorber during adsorption step a).

10. The method of claim 1 wherein the adsorbent for the organic solvent contains adsorptive porous resin beads prepared by swelling purified haloalkylated, cross-linked beads of a copolymer comprising units of i) styrene or alkylstyrene and ii) divinylbenzene or trivinylbenzene or both in an inert organic liquid and post-cross-linking the swollen beads in the presence of a Friedel-Crafts catalyst.

11. The method of claim 10 wherein the adsorptive porous resin beads are microporous and are derived from i) 99.8 to 98.2 weight percent of styrene or alkylstyrene and ii) 0.2 to 1.8 weight percent of divinylbenzene or trivinylbenzene, based on the total weight of i) and ii).

* * * * *